(12) United States Patent
Rakurty et al.

(10) Patent No.: US 10,279,408 B2
(45) Date of Patent: May 7, 2019

(54) GROUND SET SAW BLADE

(71) Applicant: The M. K. Morse Company, Canton, OH (US)

(72) Inventors: Chandra Sekhar Rakurty, North Canton, OH (US); Peter Christopher Vandervaart, North Canton, OH (US)

( * ) Notice: Subject to any disclaimer, the term of this patent is extended or adjusted under 35 U.S.C. 154(b) by 207 days.

(21) Appl. No.: 15/132,305

(22) Filed: Apr. 19, 2016

(65) Prior Publication Data
US 2017/0297124 A1 Oct. 19, 2017

(51) Int. Cl.
*B23D 61/12* (2006.01)
*B23D 65/00* (2006.01)

(52) U.S. Cl.
CPC ......... *B23D 61/121* (2013.01); *B23D 61/123* (2013.01); *B23D 65/00* (2013.01)

(58) Field of Classification Search
CPC .... B23D 61/12; B23D 61/121; B23D 61/123; B23D 61/127; B23D 61/14; B23D 61/16
See application file for complete search history.

(56) References Cited

U.S. PATENT DOCUMENTS

| | | |
|---|---|---|
| 2,849,037 A | 8/1958 | Wright |
| 3,110,952 A | 11/1963 | Anderson |
| 3,736,828 A | 6/1973 | Funakubo |
| 3,973,455 A | 8/1976 | Slaats et al. |
| 4,423,553 A | 1/1984 | Miyawaki |
| 4,827,822 A * | 5/1989 | Yoshida ............... B23D 61/121 83/835 |
| 5,425,296 A * | 6/1995 | Kullmann ............ B23D 61/021 83/676 |
| 5,477,763 A * | 12/1995 | Kullman .............. B23D 61/021 83/846 |
| 6,003,422 A * | 12/1999 | Holston ............... B23D 61/121 83/661 |
| 6,158,324 A | 12/2000 | Kullmann et al. |
| 6,220,139 B1 * | 4/2001 | Kobayashi .......... B23D 61/121 83/835 |
| 6,257,226 B1 | 7/2001 | Hayden, Sr. |
| 6,276,249 B1 * | 8/2001 | Handschuh ......... B23D 61/121 83/846 |
| 6,520,722 B2 * | 2/2003 | Hopper ................ B23D 61/021 407/42 |
| 6,598,509 B2 * | 7/2003 | Cook ................... B23D 61/121 125/13.01 |
| 7,036,417 B2 * | 5/2006 | Alton ................... B23D 61/121 83/846 |
| 7,121,180 B2 | 10/2006 | Shimofurutani |

(Continued)

*Primary Examiner* — Jason Daniel Prone
*Assistant Examiner* — Richard D Crosby, Jr.
(74) *Attorney, Agent, or Firm* — Black, McCuskey, Souers & Arbaugh LPA

(57) ABSTRACT

A saw blade comprises a blade backer with a pair of side surfaces that extend substantially parallel to each other. An intermediate surface extends between the pair of side surfaces of the blade backer. A plurality of teeth extends from the intermediate surface. At least one of the teeth is located entirely within planes containing the side surfaces of the blade backer. A tip is formed at an apex end portion of the one tooth. A leading face surface of the tip on the one tooth is disposed at an acute angle relative to a plane extending perpendicular to the planes containing the side surfaces of the blade backer.

13 Claims, 2 Drawing Sheets

(56) References Cited

U.S. PATENT DOCUMENTS

| | | | |
|---|---|---|---|
| 7,131,365 B2 * | 11/2006 | Hall | B23D 61/121 83/846 |
| 7,661,347 B2 * | 2/2010 | Nagano | B23D 61/121 83/835 |
| 8,113,100 B1 * | 2/2012 | Cranna | B23D 61/121 83/661 |
| RE43,287 E * | 4/2012 | Hall | 83/846 |
| 8,621,972 B2 * | 1/2014 | Nagano | B23D 61/121 83/835 |
| 8,695,470 B2 * | 4/2014 | Kullmann | B23D 61/021 83/661 |
| 9,038,512 B2 * | 5/2015 | Horiguchi | B23D 61/121 83/13 |
| 9,162,299 B2 * | 10/2015 | Kullmann | B23D 61/121 |
| 9,199,321 B2 * | 12/2015 | Novak | B23D 61/121 |
| 9,821,391 B2 * | 11/2017 | Tsujimoto | B23D 61/121 |
| 10,112,245 B2 * | 10/2018 | Hunter | B23D 61/123 |
| 2001/0015120 A1 * | 8/2001 | Hickey | B23D 61/121 83/661 |
| 2002/0184981 A1 * | 12/2002 | Tsujimoto | B23D 55/088 83/13 |
| 2003/0121391 A1 * | 7/2003 | Knebel | B23C 5/08 83/847 |
| 2008/0307936 A1 * | 12/2008 | Elliston | B23D 61/121 83/13 |
| 2011/0154970 A1 * | 6/2011 | Oshibe | B23D 61/121 83/835 |
| 2013/0180375 A1 * | 7/2013 | Rearick | B23D 61/121 83/849 |
| 2015/0027282 A1 * | 1/2015 | Fowler | B23D 61/121 83/13 |
| 2015/0190871 A1 * | 7/2015 | Dexter | B23D 61/121 83/851 |
| 2015/0266119 A1 * | 9/2015 | Christensen | B23D 61/121 83/848 |
| 2016/0008899 A1 * | 1/2016 | Hunter | B23D 61/121 83/849 |
| 2017/0056989 A1 * | 3/2017 | Vogel | B23D 61/121 |
| 2017/0297124 A1 * | 10/2017 | Rakurty | B23D 61/121 |
| 2017/0355030 A1 * | 12/2017 | Fowler | B23D 61/121 |
| 2018/0056404 A1 * | 3/2018 | Beach | B23B 51/0406 |
| 2018/0099341 A1 * | 4/2018 | Rakurty | B23D 61/14 |

\* cited by examiner

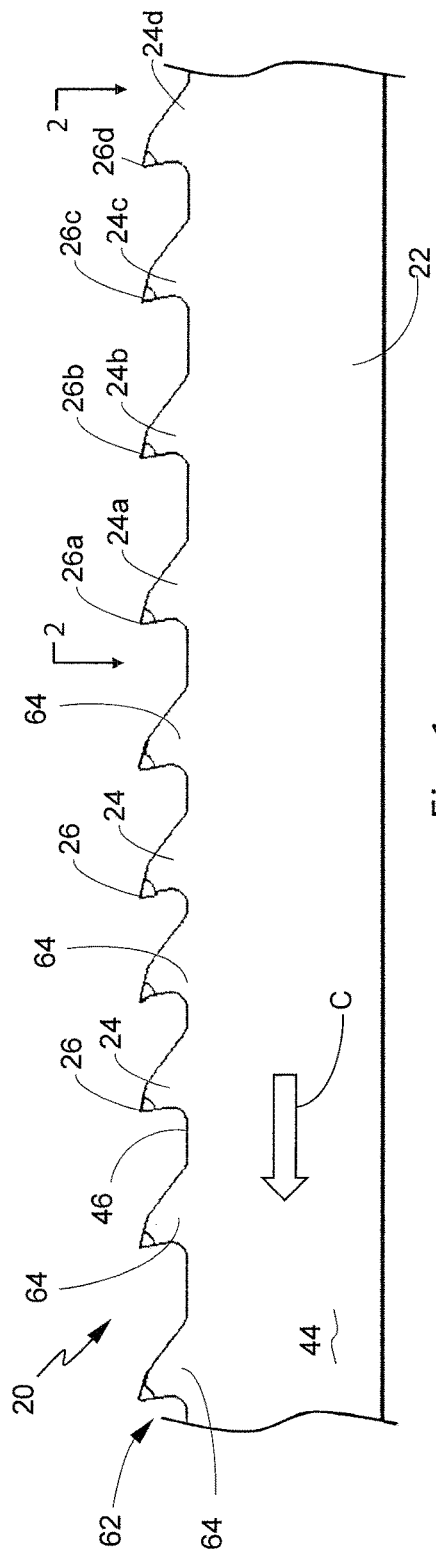
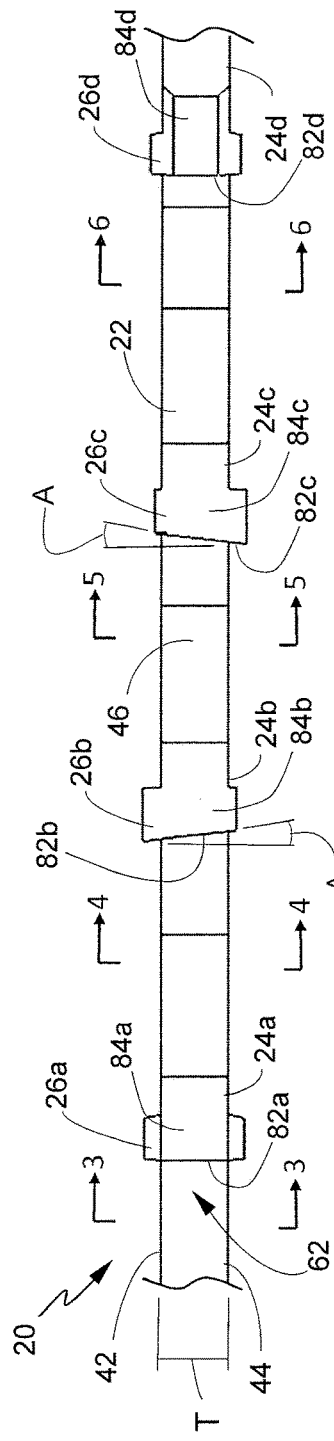
Fig. 1
Fig. 2

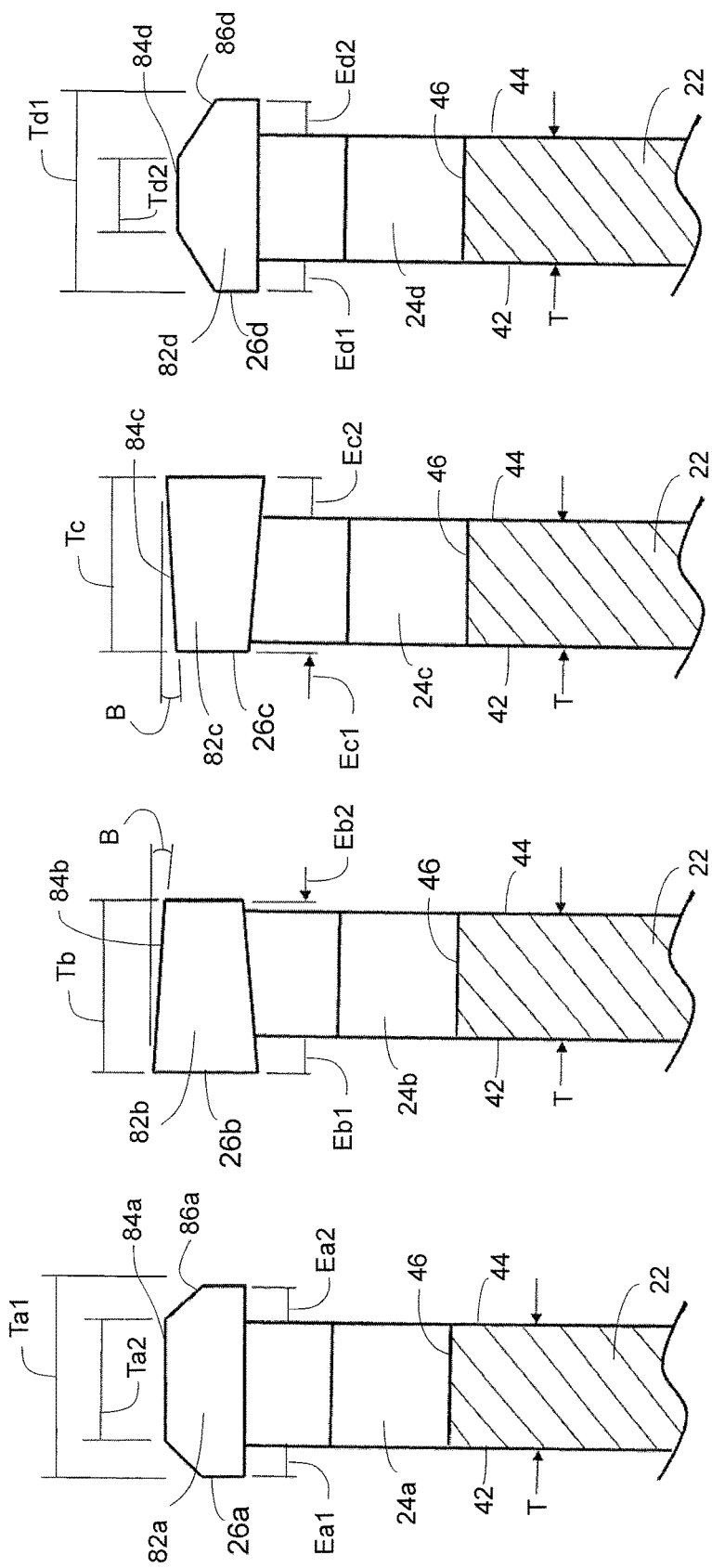

GROUND SET SAW BLADE

TECHNICAL FIELD

This relates generally to cutting tools or implements, such as a cutting blade with a cutting edge. In particular, this relates to cutting implements, such as a saw having a toothed blade.

BACKGROUND

A saw, such as a band saw having a saw blade, is typically employed to cut various materials including metallic and wooden objects. The saw blade includes a blade backer of a certain thickness. A cutting edge is formed on the blade backer. The cutting edge has a plurality of teeth.

There are a number of characteristics for a saw blade that manufacturers attempt to control to provide a saw blade appropriate for a particular application. A variety of approaches are used to achieve the desired saw blade characteristics. The approaches include selecting the materials used to manufacture the blade and designing the profiles of the saw blade teeth. For example, manufactures may incorporate relatively hard materials, such as carbide, bi-metal, cermet, ceramic, diamond, or the like, into the tips of blade teeth. Because such hard materials are relatively expensive, incorporating the material only into the blade tip allows manufactures to achieve the desired characteristics of the saw blade, while minimizing cost of blade production.

In order to incorporate the selected hard material into the tooth tip, a pellet of the selected hard material is first welded to an apex of each blade tooth. Once the pellet of the selected material is welded to the tooth apex, blade manufactures grind the tooth tip. The welded material on the tooth tip typically has a width that is slightly greater than the width of the tooth and blade. The sides of the tip are typically then ground to a tip width that is essentially the same as width or thickness of the tooth and blade backer.

Blade kerf is the overall width of the cut on a workpiece as the saw blade advances through the workpiece. Generally, it is desirable to have a kerf that is relatively wider than the thickness of the tooth and blade backer, while cutting certain materials. In order to increase the kerf width, blade manufacturers transversely or laterally position portions of the teeth including their tips to locations outside of the thickness or path of travel of the blade backer by a process known as mechanical setting.

To increase blade kerf by mechanical setting, the orientation of the teeth relative to the blade backer are mechanically repositioned by applying a force on either side of each individual tooth. The force plastically deforms the tooth so that the tooth tip is transversely or laterally offset relative to the longitudinal length of the blade backer or the direction of cutting action travel on the side opposite to the impact. Based on the blade characteristics desired, the individual teeth can be offset to the either side of the blade backer, with a repeating and/or alternating pattern.

It is desirable to try to control the overall tooth offset of a given blade to ensure that the kerf is precise and uniform over the entire length of the blade. While mechanical setting allows blade manufactures to increase blade kerf, the distance the teeth are offset from the blade backer as a result of the impact force may not be as controlled as may be desired for a quality cut finish and even wear of the teeth. There are also physical and manufacturing limits as to how far the teeth can be offset. Furthermore, mechanically setting the blade teeth adds an additional processes step to the manufacturing process, which in turn increases blade manufacturing costs, production scheduling and lead time.

Thus, there is a need for a saw blade that overcomes the disadvantages of known saw blades and known methods of manufacturing. The saw blade of this disclosure and method of making a saw blade satisfy these needs.

SUMMARY

An improved saw blade and manufacturing method are provided in which a hard material is incorporated into the blade teeth tips. The tips are ground set to yield a relatively controlled, uniform and precise blade kerf. Controlled, uniform and precision ground setting individual teeth in the saw blade eliminates the need to mechanically set the teeth, thereby eliminating a step in the blade manufacturing process and decreasing associated manufacturing costs.

Specifically, according to one aspect, a saw blade comprises a blade backer with a pair of side surfaces that extend substantially parallel to each other. An intermediate surface extends between the pair of side surfaces of the blade backer. A plurality of teeth extends from the intermediate surface. At least one of the teeth is located entirely within planes containing the side surfaces of the blade backer. A tip is formed at an apex end portion of the one tooth. A leading face surface of the tip on the one tooth is disposed at an acute angle relative to a plane extending perpendicular to the planes containing the side surfaces of the blade backer.

The intermediate surface extends in a direction perpendicular to the side surfaces and a top surface of the tip on the one tooth is disposed at an acute angle relative to the intermediate surface of the blade backer. The tip has laterally opposite end portions. At least one of the end portions extends outwardly beyond one of the planes containing the side surfaces of the blade backer.

Alternatively, both laterally opposite end portions of the tip extend outwardly beyond a respective plane containing the side surfaces of the blade backer. A first end portion of the tip may extend a first distance outwardly from a plane containing one of the side surfaces of the blade backer that is greater than a second distance that a second end portion of the tip extends outwardly from the plane containing the other of the side surfaces of the blade backer. The first end portion of the tip may extend a first distance outwardly from a plane containing one of the side surfaces of the blade backer that is substantially the same as a second distance that a second end portion of the tip extends outwardly from the plane containing the other of the side surfaces of the blade backer.

According to another aspect, a method of manufacturing a tooth of a cutting implement includes providing a backer having a pair of side surfaces extending substantially parallel to each other and an intermediate surface extending between the pair of side surfaces. A tooth portion is formed on the intermediate surface. The tooth portion is located entirely within planes containing the side surfaces of the backer. A tip is welded to an apex of the tooth portion and has laterally opposite end portions. A leading face surface of the tip is ground at an angle relative to a plane extending perpendicular to the planes containing the side surfaces of the backer.

DESCRIPTION OF THE DRAWINGS

Exemplary aspects are illustrated and described below. The aspects apply non-limiting concepts and are set forth in the following description and are illustrated in the drawings in which similar reference numbers throughout the drawings refer to similar parts and concepts, wherein:

FIG. 1 is a side elevational view of a partial section of a saw blade according to an exemplary aspect;

FIG. 2 is a plan view of a portion of the partial section of the saw blade in FIG. 1, taken approximately along line 2-2 of FIG. 1, illustrating exemplary relationships of various tooth tips on the saw blade;

FIG. 3 is an enlarged cross sectional view of the saw blade in FIG. 2, taken approximately along line 3-3 of FIG. 2, illustrating a tooth structure according to one aspect;

FIG. 4 is a view similar to FIG. 3 and taken approximately along line 4-4 of FIG. 2, illustrating a tooth structure according to another aspect;

FIG. 5 is a view similar to FIG. 3 and taken approximately along line 5-5 of FIG. 2, illustrating a tooth structure according to another aspect; and FIG. 6 is a view similar to FIG. 3 and taken approximately along line 6-6 of FIG. 2, illustrating a tooth structure according to yet another aspect.

DETAILED DESCRIPTION

A cutting tool or implement, according to one aspect, is depicted as an exemplary saw blade 20 (FIGS. 1 and 2) with a unique tooth tip construction and improved performance over previously known cutting implements. An improved method of making the saw blade is also disclosed according to another aspect. The saw blade 20 achieves improved cut finish and even tooth wear. The saw blade 20 has tooth tips that are angle ground set only which allows controlled, uniform and precise tip profile customization flexibility advantages over mechanically set blades and eliminates the mechanical setting process entirely.

The saw blade 20 includes a blade backer 22. Multiple individual teeth, generally indicated by reference number 24, are integrally formed on the blade backer 22. The saw blade 20 advances in a cutting direction C so the teeth 24 can remove material from a workpiece. Tips, generally indicated by reference number 26, are formed on respective individual teeth 24. Each of the tips 26 is precisely and uniformly ground relative to the blade backer 22.

A more controlled, precise and uniform kerf than those of previously known cutting implements is possible with the saw blade 20. This provides a desirably better finish on a cut surface of the workpiece and consistent wear on every tooth 24 of the saw blade 20. The more controlled, precise and uniform kerf is established by the construction of the tips 26 of the teeth 24 according to one aspect, as will be described below. In addition, other properties and characteristics of the saw blade 20 may be customized.

It is to be understood that the configuration of the saw blade 20 may be applied to any type of cutting tool or implement, including band saw blades, circular saw blades, reciprocating saw blades, hacksaw blades, scroll saw blades and hole saw blades, all of which shall be referred to as the saw blade 20 for the purpose of convenience. While the saw blade 20 is described below as having essentially a linear configuration for at least a portion of the saw blade, it will be appreciated that the description equally applies to hole saws in which opposite sides of the saw blade, blade backer and teeth are concentric. Thus, when side surfaces are referred to as extending or being substantially parallel to one another in the description, it is intended that the parallel sides will also apply equally to and include concentric sides of a saw blade.

The saw blade 20 includes a blade backer 22. The blade backer 22 includes a pair of side surfaces 42, 44 (FIGS. 2-6) which extend substantially parallel to each other. The blade backer 22 has a width or thickness T defined as the perpendicular distance between the side surfaces 42, 44. Each of the side surfaces 42, 44 is contained in a respective plane. The planes containing the side surfaces 42, 44, thus, also extend substantially parallel to each other. An upper, as viewed in the Figs., gullet land or intermediate surface 46 extends between and connects the side surfaces 42, 44. The intermediate surface 46 extends transversely, and preferably perpendicular, to the side surfaces, 42, 44. The blade backer 22 of the saw blade 20 is made from any suitable material for the intended application. For example, the material that the blade backer 22 is made from needs to be a strong and ductile material, such as a metal of carbon alloy steel.

A cutting edge 62 is integrally formed on the intermediate surface 46 of the blade backer 22 by a suitable process, such as stamping, machining, laser cutting and the like. The cutting edge 62 includes multiple teeth 24 extending from the intermediate surface 46 of the blade backer 22. The teeth 24 may be arranged in a uniformly spaced and repeating pattern or in a pattern where teeth are spaced at different distances, depending on the intended application. Each tooth 24 has a root portion 64 that is integrally formed on the blade backer 22 and serves as a transition from the blade backer to the respective tooth. Each tooth 24 has side surfaces that are extensions of the side surfaces 42, 44 of the blade backer and are located entirely within the planes containing the side surfaces. Each tooth 24 also has an apex located opposite the root portion 64.

Each of the specific teeth 24a, 24b, 24c, 24d, as illustrated in FIGS. 2-6, has an exemplary profile of the tip 26a, 26b, 26c, 26d that is made according to non-limiting aspects as will be described below. The teeth 24a, 24b, 24c, 24d have their respective tips 26a, 26b, 26c, 26d formed with a specific shape or profile to provide a relatively more controlled, precise and uniform kerf than exists in previously known saw blades. The teeth 24 and tips 26 may be of any shape or profile, or combination of shapes and profiles, in order to form the cutting edge 62.

A first tooth 24a, a second tooth 24b, a third tooth 24b and a fourth tooth 24d are illustrated in FIGS. 1 and 2, by way of example, as forming at least a portion of the cutting edge 62 of the saw blade 20. The tips 26a, 26b, 26c, 26d are preferably welded to the upper edge, as viewed in the Figs., or apex opposite the root portion 64 of the respective teeth 24a, 24b, 24c, 24d. The tips 26a, 26b, 26c, 26d are preferably made of a relatively hard material such as carbide, but could also be made from bi-metal, cermet, ceramic, diamond, or other relatively hard materials without affecting the overall concept, function or operation of the disclosed aspect. The tips 26a, 26b, 26c, 26d define a cutting surface of the respective teeth 24a, 24b, 24c, 24d and are the first part of the saw blade 20 to engage material of the workpiece that is being cut. These hard tip materials are relatively expensive, so it is desired to use as a little of these materials as possible and in a location that is necessary, such as the cutting surface, with respect to the direction of cut C, of each tooth 24a, 24b, 24c, 24d. The tips 26a, 26b, 26c, 26d extend for a length or distance beyond or outward of the width of the teeth 24a, 24b, 24c, 24d. It will be appreciated that the tips 26a, 26b, 26c, 26d could be bonded or adhered to the respective teeth 24a, 24b, 24c, 24d by suitable means as an alternative to welding.

An important feature of the saw blade 20 is illustrated in FIGS. 2-6. Specifically, the tips 26a, 26b, 26c, 26d of the respective teeth 24a, 24b, 24c, 24d are ground set only during manufacture. The ground set manufacturing process allows very controlled, precise and uniform shapes and profiles of each of the tips 26a, 26b, 26c, 26d of the teeth 24a, 24b, 24c, 24d. Each tip 26a, 26b, 26c, 26d of the respective tooth 24a, 24b, 24c, 24d has at least one and preferably a pair of laterally opposite end portions, taken in the direction transverse to the planes containing the side surfaces 42, 44 of the saw blade 20. The one end portion, or preferably both laterally opposite end portions, of each tip 26a, 26b, 26c, 26d are preferably located outward of the planes containing the side surfaces 42, 44.

Each tip 26a, 26b, 26c, 26d of the respective tooth 24a, 24b, 24c, 24d is ground set so that at least one lateral edge is located at a very controlled, uniform and precise distance outwardly of the respective plane containing a side surface 42, 44 of the saw blade 20. The remainder of the tooth 24a, 24b, 24c, 24d is located entirely between the planes containing the side surfaces 42, 44. In this respect, no mechanical setting is used, needed or desired. The ground set operation on the tips 26a, 26b, 26c, 26d of the respective tooth 24a, 24b, 24c, 24d can be customized to provide a desired tooth profile of the saw blade 20. One aspect of the saw blade 20 only utilizes a ground setting process to develop the finished shape and profile of each tooth tip. Because mechanically setting the saw blade teeth to increase kerf width is generally uncontrollable and causes imprecise and non-uniform blade kerf widths, ground setting provides advantages for certain applications that the saw blade 20 may be used in.

Each one of the tips 26a, 26b, 26c, 26d of the respective tooth 24a, 24b, 24c, 24d is ground set so that the tip has a specific shape or profile that may be easily customized. The saw blade 20 may have any one or all of the configurations, shapes, profiles, characteristics and/or features of tips 26a, 26b, 26c, 26d of the teeth 24a, 24b, 24c, 24d. Any combination of the configurations, shapes, profiles, characteristics and/or features of the tips 26a, 26b, 26c, 26d may be employed in whole or in part to any of the teeth 24a, 24b, 24c, 24d.

An important feature of the disclosed aspect is illustrated in FIGS. 2, 4 and 5. In particular, the tips 26b and 26c are ground set so that a rake face or leading face surface 82b, 82c is ground at an acute or a relatively slight face bevel angle A relative to a plane extending perpendicular to the direction of cut C and relative to the planes that contain the side surfaces 42, 44 of the blade backer 22. This face bevel angle A of leading face surface 82b, 82c serves to direct material removed from the workpiece during a cutting operation in a direction away from the cutting path of the teeth 24b or 24c. This can help increase blade service life and cut finish quality by preventing or minimizing removed material from re-entering the cutting action. Additionally, the entire shape or profile of the tips 26a, 26b, 26c, 26d of the teeth 24a, 24b, 24c, 24d may be ground set and customized for ease of manufacturing. For example, the sides, the top, as viewed in FIGS. 3-6, the leading face surface, the trailing edge, the rake angle, flank angle, and the like may be ground set. Customization or design variations can easily be accomplished by reprogramming automated grinding machinery.

Another important feature of the disclosed aspect is also illustrated in FIGS. 4 and 5. A top surface 84b, 84c of a respective tip 26b, 26c is ground set and forms an edge with the respective leading surface 82b, 82c. Each top surface 84b, 84c extends in a direction at an acute or a relatively small top bevel angle B, as viewed in FIGS. 3 and 4, relative to the intermediate surface 46 of the blade backer 22. This top bevel angle B of top surface 84b, 84c also serves to direct material removed from the workpiece during a cutting operation in a direction away from the cutting path of the teeth 24b or 24c. The ground set profile of the leading surfaces 82b, 82c extending at the face angle A interacting with the top surfaces 84b, 84c extending at the top bevel angle B that provides a relatively better cut finish and wears more evenly than previously known blades.

According to the aspects disclosed for the saw blade 20, the tips 26a, 26b, 26c, 26d of the teeth 24a, 24b, 24c, 24d can be either symmetrically and asymmetrically ground relative to the thickness T or a plane that bisects the blade backer 22. Also, according to the aspects disclosed for the saw blade 20, the tips 26a, 26b, 26c, 26d of the teeth 24a, 24b, 24c, 24d can be ground with or without the face bevel angle A on the leading face surfaces 82a, 82b, 82c, 82d and with or without a top bevel angle B on the top surfaces 84a, 84b, 84c, 84d.

With reference to FIGS. 2, 3 and 6, the tips 26a and 26d are symmetrically ground with respect to the thickness T or centerline of the respective teeth 24a and 24d and the blade backer 22. Referring to FIGS. 2, 4 and 5, the tips 26b and 26c are asymmetrically ground set with respect to the thickness T or centerline of the respective teeth 24b and 24c and the blade backer 22. The tips 26b, 26c are generally offset on alternating sides of the blade backer. This ground profile of the tips 26a, 26b, 26c, 26d of the teeth 24a, 24b, 24c, 24d provide a relatively more controlled, precise and uniform tip, tooth to tooth, than what was provided by previously known saw blades.

With particular reference to FIGS. 2 and 3, the tip 26a is symmetrically ground set with respect to the thickness T or centerline of the respective tooth 24a and the blade backer 22. The tip 26a has an overall width or thickness Ta1 (FIG. 3) that is greater than the thickness T of the blade backer 22. The tip 26a has a first offset that extends from side surface 42 a distance Ea1. The tip 26a also has a second offset that extends from side surface 44 a distance Ea2 and that is substantially equal to the distance Ea1. The tip 26a also has a central top surface portion 84a that is centered relative to the width or thickness T of the blade backer 22. The tip 26a has a width or thickness Ta2 that is substantially equal to the thickness T of the blade backer 22. The tip 26a also includes a pair of chamfers 86a located at laterally opposite ends of the central portion 84a, as viewed in FIG. 3. The tip 26a has a leading face surface 82a that is formed to extend in a substantially transverse or perpendicular direction relative to the side surfaces 42, 44 of the blade backer 22, as viewed in FIG. 2. The central top surface portion 84a extends substantially parallel to the intermediate surface 46, as viewed in FIG. 3. The saw blade 20 is, thus, provided with a relatively more controlled, precise and uniformly repeatable kerf than what was previously provided by known saw blades.

With reference to FIGS. 2 and 4, the tip 26b is asymmetrically ground with respect to the thickness T or centerline of the respective tooth 24b and the blade backer 22. The tip 26b has an overall width or thickness Tb (FIG. 4) that is greater than the thickness T of the blade backer 22. The tip 26b is offset to the left, as viewed in FIG. 4, relative to the width or thickness T and centerline of the blade backer 22. The tip 26b has a first offset that extends from side surface 42 a distance Eb1. The tip 26b also has a second offset that extends from side surface 44 a distance Eb2 and that is less than the distance Eb1. The distances Eb1 and Eb2 may be any suitable distances, but preferably distance Eb1 is at least twice the distance Eb2. The tip 26b has a leading face surface 82b that is formed to extend at a face bevel angle A relative to the side surfaces 42, 44 of the blade backer 22, as viewed in FIG. 2. The face bevel angle A is preferably in the range of 1° to 10°.

A top surface 84b of the tip 26b is ground and forms a cutting edge with the respective leading surface 82b. The top surface 84b extends in a direction at a top bevel angle B, as viewed in FIG. 4, relative to the intermediate surface 46 of the blade backer 22. The top bevel angle B is preferably in the range of 1° to 8°. The ground set profile of the leading face surface 82b extending at the face angle A interacting with the top surface 84b extending at the top bevel angle B provides a cutting edge that lasts longer and wears more evenly than previously known blades. The corner of the leading face surface 82b that first contacts material of a workpiece is on the side of the offset with the largest distance Eb1. The saw blade 20 is, thus, provided with a relatively more controlled, precise and uniformly repeatable kerf than what was previously provided by known saw blades.

With reference to FIGS. 2 and 5, the tip 26c is asymmetrically ground with respect to the thickness T or centerline of the respective tooth 24c and the blade backer 22. The tip 26c has an overall width or thickness Tc (FIG. 5) that is greater than the thickness T of the blade backer 22. The tip 26c is offset to the right, as viewed in FIG. 5, relative to the width or thickness T of the blade backer 22. The tip 26c has a first offset that extends from side surface 42 a distance Ec1. The tip 26c also has a second offset that extends from side surface 44 a distance Ec2 and that is greater than the distance Ec1. The distances Ec1 and Ec2 may be any suitable distances, but preferably distance Ec2 is at least twice the distance Ec1. The tip 26c has a leading face surface 82c that is formed to extend at a face bevel angle A relative to the side surfaces 42, 44 of the blade backer 22, as viewed in FIG. 2. The face bevel angle A is preferably in the range of 1° to 10° and the leading face surface 82c extends in a different direction than leading face surface 82c.

A top surface 84c of the tip 26c is ground set and forms a cutting edge with the respective leading surface 82c. The top surface 84c extends in a direction at a top bevel angle B, as viewed in FIG. 5, relative to the intermediate surface 46 of the blade backer 22 but in an opposite direction that top surface 84b extends. The top bevel angle B is preferably in the range of 1° to 8°. The ground set profile of the leading face surface 82c extending at the face angle A interacting with the top surface 84c extending at the top bevel angle B provides a cutting edge that lasts longer and wears more evenly than previously known blades. The corner of the leading face surface 82c that first contacts material of a workpiece is on the side of the offset with the largest distance Ec1. The saw blade 20 is, thus, provided with a relatively more controlled, precise and uniformly repeatable kerf than what was previously provided by known saw blades.

Referring now to FIGS. 2 and 6, the tip 26d is symmetrically ground with respect to the thickness T or centerline of the respective tooth 24d and the blade backer 22. The tip 26d has an overall width or thickness Td1 (FIG. 6) that is greater than the thickness T of the blade backer 22. The tip 26d has a first offset that extends from side surface 42 a distance Ed1. The tip 26d also has a second offset that extends from side surface 44 a distance Ed2 and that is substantially equal to the distance Ed1. The tip 26d also has a central top surface portion 84d that is centered relative to the width or thickness T of the blade backer 22 and has a width or thickness Td2 that is less than the thickness T of the blade backer. The tip 26d also includes a pair of chamfers 86d located at laterally opposite ends of the central portion 84d. The tip 26d has a leading face surface 82d that is formed to extend in a substantially transverse or perpendicular direction relative to the side surfaces 42, 44 of the blade backer 22, as viewed in FIG. 2. The leading face surface 82d of the central portion 84d extends in a direction substantially parallel to the intermediate surface 46, as viewed in FIG. 6. The saw blade 20 is, thus, provided with relatively more controlled, precise and uniformly repeatable kerf than what was previously provided by known saw blades.

The tips 26a, 26b, 26c, 26d of the teeth 24a, 24b, 24c, 24d may also have other properties or profiles ground set. For example, a rake angle, flank angle and various surfaces may also be precisely and uniformly provided by ground setting. It will be appreciated that the extent and amount of face bevel angle A and top bevel angle B could be in any appropriate direction and/or angle. It will also be appreciated that any feature, characteristic or profile of any tip 26a, 26b, 26c, 26d that was described may be incorporated onto any tooth 24a, 24b, 24c, 24d.

This disclosure also includes a method of manufacturing a saw blade 20. According to another aspect, a method of manufacturing a tooth of a cutting implement, such as a saw blade 20 (FIGS. 1 and 2), includes providing a blade backer 22 having a pair of side surfaces 42, 44 that extend substantially parallel to each other. An intermediate surface 46 extends between the pair of side surfaces and is formed to extend substantially perpendicular to the side surface. A plurality of spaced apart teeth 24 are formed to extend from the intermediate surface 46. The teeth 24 are located entirely within planes containing the side surfaces 42, 44 of the blade backer 22.

A tip 26 is welded to an apex of each tooth 24. It will be apparent that the tip 26 could be attached to the tooth 24 by suitable means other than welding. The tip 26 has laterally opposite end portions. The tip 26 is made from any suitable relatively hard material, such as by way of non-limiting example, carbide, bi-metal, cermet, ceramic and diamond. At least one lateral end portion of the tip 26 is ground so the ground end portion extends outwardly beyond a respective one of the planes containing the side surfaces 42, 44 of the blade backer 22.

According to another aspect, a leading face surface 82b, 82c of the tip 26 is ground to extend at an angle A (FIG. 2) relative to the planes containing the side surfaces 42, 44 of the blade backer 22. A top surface 84b, 84c of the tip 26 is ground to extend at an angle B (FIGS. 4 and 5) relative to the intermediate surface 46 of the blade backer 22. Preferably, each of the laterally opposite end portions of the tip 26 are ground so both of the end portions extend outwardly beyond a respective plane containing the side surfaces 42, 44 of the blade backer 22, as viewed in FIGS. 3-6.

According to another aspect, a first end portion of the tip 26 is ground to extend asymmetrically a first distance Eb1, Ec2 outwardly from a plane containing one of the side surfaces 42, 44 of the blade backer 22, as viewed in FIGS. 4 and 5. The first distance Eb1, Ec2 is greater than a second distance Eb2, Ec1 that a second opposite end portion of the tip 26 is ground to extend outwardly from the plane containing the other of the side surfaces 42, 44 of the blade backer 22.

According to an alternate aspect, the first end portion of the tip 26 is ground to extend a first distance outwardly from a plane containing one of the side surfaces 42, 44 of the blade backer 22, as viewed in FIGS. 3 and 6. The first distance Ea1, Ed1 is substantially the same as a second distance Ea2, Ed2 that a second opposite end portion of the tip 26 is ground to extend outwardly from the plane containing other of the side surfaces 42, 44 of the blade backer 22.

By providing the saw blade 20 which has its tips 26a, 26b, 26c, 26d customized by a ground setting process enables the individual tips to be laterally offset either symmetrically or asymmetrically relative to the blade backer 22. The saw blade 20 is, thus, provided with relatively more controlled, precise and uniformly repeatable kerf than what was previously provided by known saw blades. In addition, the saw blade 20 provides a ground set saw blade which benefits from customization advantages, while eliminating the mechanical setting process, thereby reducing manufacturing steps and associated costs.

The exemplary embodiments of the saw blade 20 according to disclosed aspects may be altered for other types of cutting blades without changing the overall concept or operation of the present invention. In addition, a different spacing of the teeth may be employed without changing the overall concept or operation of what is contained in this disclosure. Moreover, different combinations of symmetrically and asymmetrically ground teeth could be employed without changing the overall concept or operation of what is contained in this disclosure.

Materials other than those described can be incorporated as blade teeth tips without changing the overall concept or operation of what is contained in this disclosure. It is contemplated that saw blade may be made of any material known to those in the art that is suitable for cutting without changing the overall concept or operation of the present invention. The present invention saw blade may apply to other types of saw blades, including jigsaw blades, saber saw blades, scroll saw blades and hacksaw blades, without changing the overall concept or operation of the present invention.

Also, blade teeth could be customized with different tooth rake angles, flank angles, bevel angles and heights without changing the overall concept or operation of what is contained in this disclosure. Moreover, different tip pitches for the teeth are contemplated without changing the overall concept or operation of what is contained in this disclosure. Tooth structures other than those shown and described herein are contemplated without changing the overall concept or operation of what is contained in this disclosure.

In the foregoing description, certain terms have been used for brevity, clearness and understanding, but no unnecessary limitations are to be implied beyond the requirements of the prior art, because such terms are used for descriptive purposes and are intended to be broadly construed.

The present invention has been described with reference to specific aspects. It is understood that this description and illustration is by way of example and not by way of limitation. Potential modifications and alterations will occur to others upon a reading and understanding of this disclosure, and it is understood that the invention includes all such modifications and alterations and equivalents thereof.

What is claimed is:

1. A saw comprising:
    a blade backer having a pair of side surfaces extending substantially parallel to each other;
    an intermediate surface of the blade backer extends between the pair of side surfaces of the blade backer;
    a plurality of teeth extends from the intermediate surface, at least one tooth of the plurality of teeth has a portion located entirely within planes extending coplanar with the side surfaces of the blade backer;
    a tip formed at an apex end portion of the one tooth; and
    an entire leading face cutting surface of the tip on the one tooth being disposed at an acute angle relative to a plane extending perpendicular to the intermediate surface of the blade backer, a first side end of the leading face cutting surface extending outwardly from one of the planes that extend coplanar with the side surfaces of the blade backer a first distance taken at a height, a second side end of the leading face cutting surface extending outwardly from the other one of the planes that extend coplanar with the side surfaces of the blade backer a second distance different than the first distance taken at the height.

2. The saw of claim 1 wherein the intermediate surface extends in a direction perpendicular to the side surfaces and further including a top surface of the tip on the one tooth disposed at an acute angle relative to the intermediate surface of the blade backer.

3. The saw of claim 1 wherein the tip is welded to the one tooth and the tip is made from a material selected from the group comprising carbide, bi-metal, cermet, ceramic and diamond.

4. The saw of claim 1 wherein at least one surface of the tip is ground.

5. The saw of claim 1 wherein each of the plurality of teeth has a tip formed at an apex portion, each tip having laterally opposite end portions, at least one of the end portions of each tip extending outwardly beyond one of the planes extending coplanar with the side surfaces of the blade backer.

6. The saw of claim 1 wherein the first distance is at least twice the second distance.

7. The saw of claim 1 wherein the first side end is parallel to one of the planes that extend coplanar with the side surfaces of the blade backer and the second side end is parallel to the other one of the planes that extend coplanar with the side surfaces of the blade backer.

8. A tooth configuration for a cutting implement that has a backer with a pair of side surfaces extending substantially parallel to each other and an intermediate surface extending between the pair of side surfaces of the backer, the tooth configuration comprising:
    a tooth extending from the intermediate surface, a portion of the tooth being located entirely within planes extending coplanar with the side surfaces of the backer;
    a tip formed at an apex end portion of the tooth; and
    an entire leading face cutting surface of the tip being disposed at an acute angle relative to a plane extending perpendicular to the intermediate surface of the backer, a first side end of the leading face cutting surface extending outwardly from one of the planes that extend coplanar with the side surfaces of the blade backer a first distance taken at a height, a second side end of the leading face cutting surface extending outwardly from the other one of the planes that extend coplanar with the side surfaces of the blade backer a second distance different than the first distance taken at the height.

9. The tooth configuration of claim 8 wherein the intermediate surface extends in a direction perpendicular to the side surfaces and a top surface of the tip on the tooth is disposed at an acute angle relative to the intermediate surface of the backer.

10. The tooth configuration of claim 8 wherein the tip is attached to the tooth and the tip is made from a material selected from the group comprising carbide, bimetal, cermet, ceramic and diamond.

11. The tooth configuration of claim 8 wherein at least one surface of the tip is ground.

12. The tooth configuration of claim 8 wherein the first distance is at least twice the second distance.

13. The tooth configuration of claim 8 wherein the first side end is parallel to one of the planes that extend coplanar with the side surfaces of the blade backer and the second side end is parallel to the other one of the planes that extend coplanar with the side surfaces of the blade backer.

* * * * *